Figure 1:
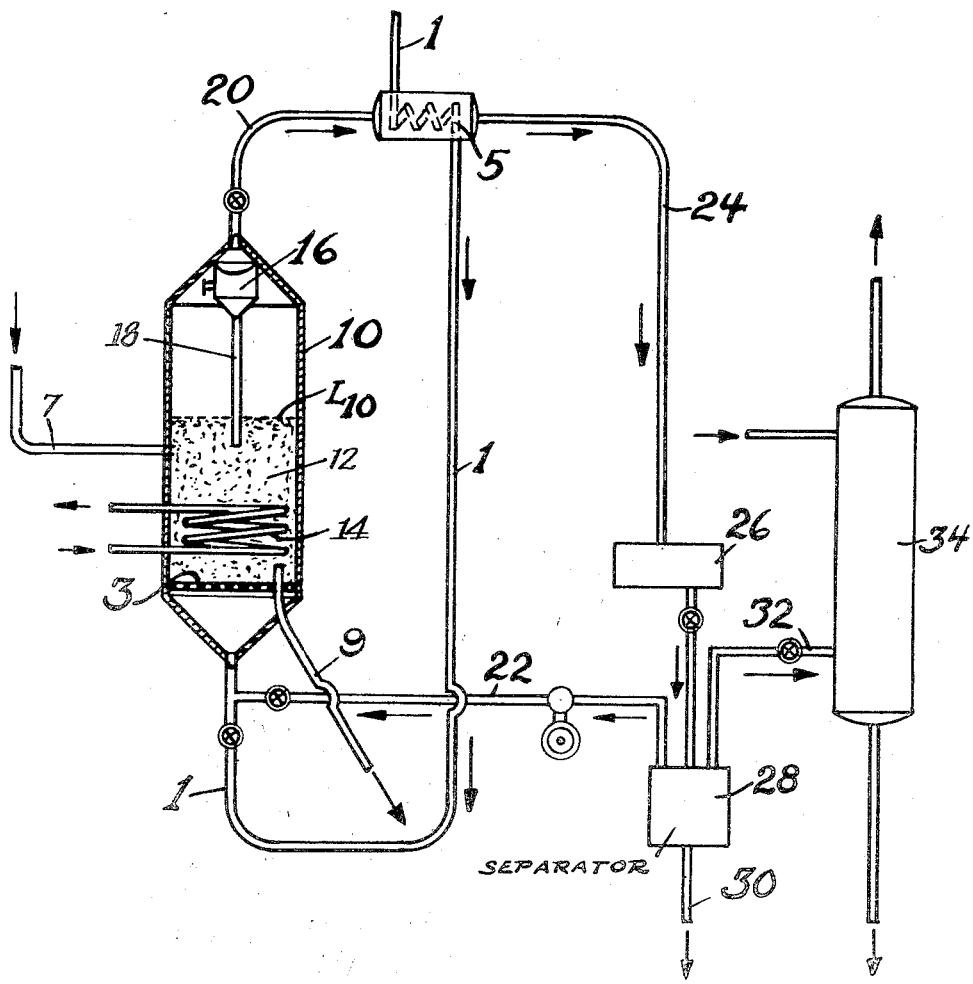
Figure 2:
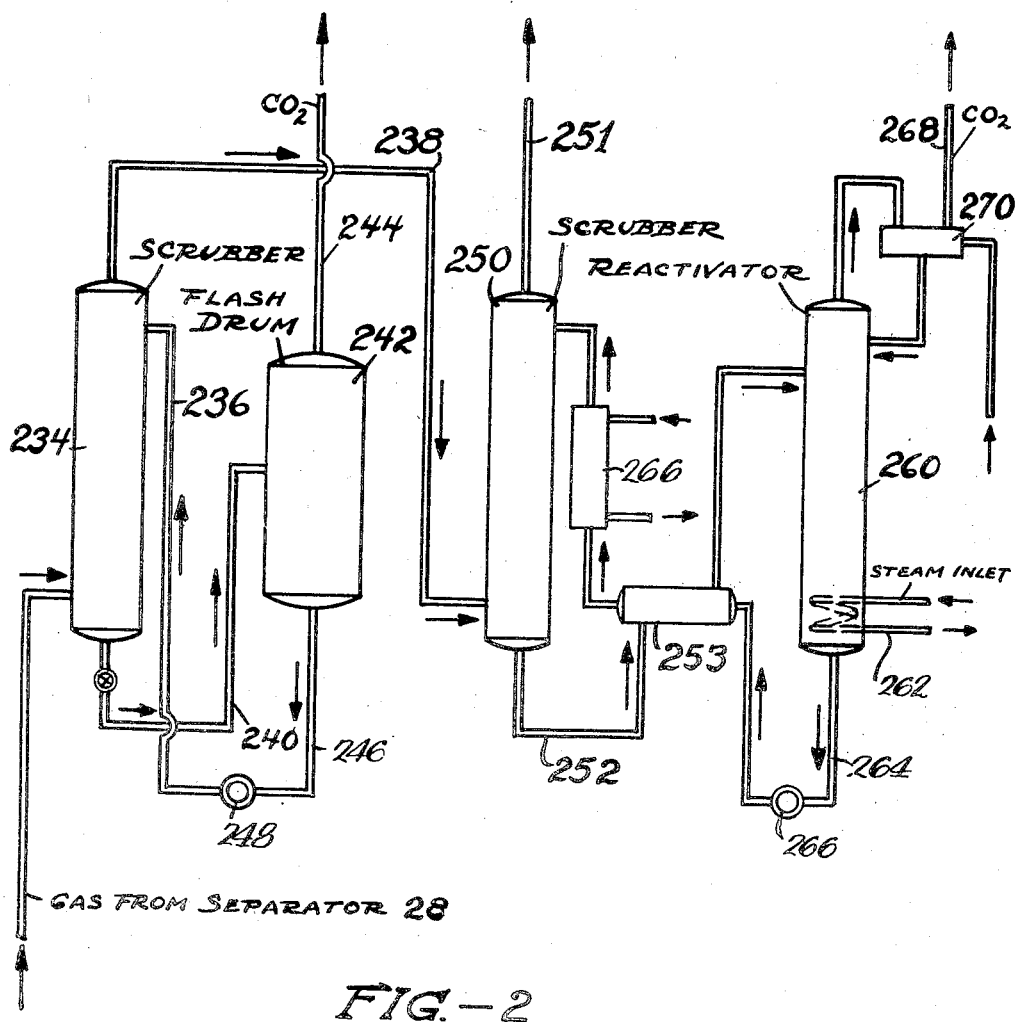

Patented Oct. 24, 1950

2,527,154

UNITED STATES PATENT OFFICE 2,527,154

PRODUCTION OF FUEL GASES

Walter G. Scharmann, Westfield, N. J., assignor to Standard Oil Development Company, a corporation of Delaware Application October 18, 1946, Serial No. 703,989

9 Claims. (Cl. 260—449.6)

The present invention relates to the production of fuel gases of high heating value and, more particularly, to the production of high B. t. u. fuel gases from tail gases of low heating value obtained in the catalytic synthesis of normally liquid hydrocarbons and oxygenated compounds from carbon monoxide and hydrogen.

The catalytic synthesis of hydrocarbon oils from carbon monoxide and hydrogen has been assuming increasing importance in recent years as a liquid fuel source supplementing and potentially replacing the steadily decreasing crude oil resources. The hydrocarbon synthesis may be operated on the basis of using either natural gas or carbonaceous solids such as coal, etc. for the production of synthesis gas containing carbon monoxide and hydrogen. Particularly, the process utilizing coal has not as yet advanced to a state of development at which synthetic oils would be economically competitive with natural mineral oils.

This situation has stimulated considerable research activity aiming at the improvement of the process as well as product yields and quality. Previous attempts in this direction have been concentrated largely on the valuable liquid or readily liquefiable synthesis products such as fuels for internal combustion engines, lubricants and various oxygenated compounds.

However, the hydrocarbon synthesis yields substantial amounts of a further by-product in the form of tail gas from which normally liquid synthesis products have been removed and which is rich in combustible constituents such as hydrogen, carbon monoxide and hydrocarbon gases. This tail gas which normally amounts to about 5,000–10,000 cu. ft. per bbl. of liquid products formed has the great advantage of being substantially sulphur-free but has been of little commercial value heretofore as a result of its low B. t. u. value.

The heating value is low because of the presence of carbon dioxide, carbon monoxide, hydrogen and substantial amounts of nitrogen, the latter introduced by the coal or natural gas used as starting material for the synthesis gas and/or by air employed in the synthesis gas manufacture. In addition, particularly when iron catalysts are used for the production of high octane motor fuels and oxygenated compounds, the tail gas contains appreciable proportions of unsaturated hydrocarbon gases. The composition of tail gas may vary within the approximate ranges given below:

| | Percent |
|---|---|
| $H_2$ | 10– 20 |
| CO | 1– 5 |
| $CH_4$ | 15– 30 |
| $C_2H_6$ | 3– 6 |
| $C_2H_4$ | 2– 4 |
| $C_3H_6$ | 0.1– 0.4 |
| $N_2$ | 2– 10 |
| $CO_2$ | 68– 26 |

The heating value of synthesis tail gas usually falls within the approximate range of from 300 to 500 B. t. u.'s per cu ft. This heating value may be increased by $CO_2$ removal to a maximum of about 800 B. t. u.'s which falls far short of the approximately 1000 B. t. u.'s required of a marketable pipe line gas. As a result, the synthesis tail gas has heretofore failed to constitute an asset in the synthesis economics and has either been vented or used for heating purposes within the synthesis plant.

On the other hand, the sulphur-free synthesis tail gas, if its heating value could be sufficiently increased to make it useful as a pipe line gas, would be a valuable and readily marketable product. This is particularly true when the synthesis is based on coal or other carbonaceous solids and conducted in coal mining areas or the like located near highly industrialized areas where a fuel gas of high heating value is at a premium. It is evident, therefore, that a marked increase of the B. t. u. value of the tail gas will considerably improve the economics of the hydrocarbon synthesis process and make it more competitive with natural oils.

The present invention refers to a novel process for producing a marketable pipe line gas from low B. t. u. synthesis tail gas as will appear from the following description read with reference to the accompanying drawings.

It is, therefore, the principal object of the present invention to improve the economies of the catalytic synthesis of hydrocarbons from CO and $H_2$ by increasing the heating value of synthesis tail gas.

Another object of the present invention is to produce a marketable pipe line fuel gas from the tail gas of the catalytic synthesis of hydrocarbons from CO to $H_2$.

A more specific object of the present invention is to produce a marketable pipe line fuel gas of high heating value from the low B. t. u. tail gas of the synthesis of hydrocarbons from CO and $H_2$ produced by the gasification of carbonaceous solids such as coal.

Other objects and advantages will appear hereinafter.

In accordance with the present invention tail gas produced in the catalytic synthesis of hydrocarbons from CO and $H_2$ is subjected to the action of a hydrogenating catalyst at conditions favoring the reaction of its hydrogen constituent with its hydrogenatable constituents such as CO, $CO_2$, and unsaturates to convert at least a substantial portion of these constituents into normally gaseous paraffinic hydrocarbons of higher heating value. The heating value of the converted gas may be further materially increased by the removal of such readily removable non-combustible constituents as product water and unconverted $CO_2$.

Conventional hydrogenation catalysts such as iron group metals, oxides and sulfides of group VI metals including chromium, molybdenum and tungsten, and the like are useful for my process. Catalysts forming saturated hydrocarbons from carbon oxides and hydrogen, such as cobalt or nickel are preferred. Good results may also be obtained when employing catalysts spent in the hydrocarbon synthesis, particularly spent iron synthesis catalysts.

The conversion conditions suitable for my process fall within the broad ranges of conventional catalytic gas phase hydrogenation. Best results are obtained at temperatures of about 650° to 850° F. when iron, nickel or group VI hydrogenation catalysts are used. Somewhat lower temperatures of about 500° to 750° F. may be applied in the presence of a cobalt catalyst. The pressure may be readily adapted to that of the original hydrocarbon synthesis reaction and is preferably maintained between the approximate limits of 100 and 1000 lbs. per sq. in.

While conventional fixed bed operation may be used in my gas conversion process, marked advantages are secured when the synthesis tail gas is contacted with a dense turbulent bed of finely divided catalyst fluidized by an upwardly flowing gas to form a well defined upper level. This technique permits continuous operation in a single reactor unit at a constant and uniform catalyst activity because of the perfect mixing within the fluidized solids bed which may be continuously supplied with fresh catalyst while spent catalyst may be withdrawn at the same rate for regeneration. The temperature throughout the fluidized bed is uniform and may be readily controlled at any desired level permitting greatest flexibility and adaptability to variations of the temperature and/or composition of the tail gas fed to the converter. Since the catalyst used in the fluid reactor is in a fine state of division it is particularly adaptable, because of its excellent surface characteristics, to carrying out the reactions between the rather dilute components essentially to completion.

For proper fluidization of the catalyst particle sizes varying from about 400 mesh to as much as ¼ or ½ in. diameter may be used, particle sizes of about 50-200 mesh being preferred. The linear velocity of the fluidizing gas should be about 0.1-5 ft. per second, preferably about 0.3 to 1 ft. per second at the particle sizes specified above to establish bed densities of about 10-150 lbs. per cu. ft., preferably about 15-75 lbs. per cu. ft.

It will be further appreciated that greatest process economy and efficiency are achieved when the original hydrocarbon synthesis yielding the tail gas to be converted in accordance with the invention is carried out in the presence of finely divided fluidized catalyst as it is well known in the art. In this manner the operating conditions of the integrated process may be most easily and rapidly adapted to fluctuations in the market demand for the various synthetic products. In addition, spent catalyst from the original hydrocarbon synthesis may be supplied to the gas conversion directly or after a suitable activating treatment such as solvent extraction, steam treatment, oxydation, reduction, etc.

As mentioned before, my process is of greatest advantage when applied to synthesis tail gas from a hydrocarbon synthesis based on carbonaceous solids for the synthesis gas manufacture. I prefer, therefore, to produce my new high B. t. u. fuel gas by first reacting solid carbonaceous material with steam to produce gas mixtures containing carbon monoxide and hydrogen, reacting said gas mixture in the presence of synthesis catalysts at synthesis conditions to produce liquid synthetic products and tail gas and converting said tail gas in the presence of hydrogenating catalysts at hydrogenating conditions into a high B. t. u. fuel gas.

The water gas and synthesis reactions may be carried out in any conventional manner although I prefer to employ the fluid solids technique in both reactions. Suitable processes of this type are well known in the art and need not be described herein at length for a clear understanding of my present invention.

Having set forth its objects and general nature, the invention will be best understood from the more detailed description hereinafter wherein reference will be made to the accompanying drawing wherein Figure I illustrates schematically, a system adapted to carry out the invention; and Figure II is a schematic illustration of a preferred scrubbing system useful for the purposes of the invention.

Referring now to Figure I of the drawing, synthesis tail gas from a conventional synthesis reactor is supplied through line 1 substantially at the pressure of the synthesis which may range between about 100 and 1000 lbs. per sq. in., to the lower conical portion of a substantially cylindrical converter 10 which it enters through a perforated distributing plate 3. The tail gas may be preheated by heat exchange with hot product gas in a conventional heat exchanger 5 to any desired preheating temperature of say 300°-500° F.

The tail gas entering converter 10 is contacted with a mass 12 of finely divided hydrogenation catalyst such as nickel alone or supported on clay, silica gel, kieselguhr or the like and which may have an average particle size of about 100 mesh. The linear velocity of the upwardly flowing tail gas is so controlled that mass 12 takes on the appearance of a boiling liquid having a well defined upper level L10 and an apparent density of about 15-100 lbs. per cu. ft. Linear velocities of about 0.3-3 ft. per second are suitable for this purpose at the conditions indicated. As a result of the highly turbulent condition of fluidized mass 12, the distribution of the catalyst particles and the reacting gas as well as the temperature is substantially uniform throughout the mass. The heat liberated by the exothermic hydrogenation reaction may be withdrawn by conventional means such as cooling coil 14 to establish a constant reaction temperature of, say about, 600°-800° F.

Fresh hydrogenation catalyst may be periodically or continuously supplied through line 7 which may be a part of any conventional conveying means for finely divided solids such as an aerated standpipe, a pressurized feed hopper, or a mechanical conveyor (not shown). Spent catalyst may be withdrawn through line 9 from a point above grid 3 under the combined gas and pseudo-hydrostatic pressures of mass 12, to be regenerated in any conventional manner and to be returned to line 7. Instead of feeding the catalyst directly to the converter as indicated by line 7 it may be suspended in the tail gas flowing through line 1 and carried as a solids-in-gas suspension into converter 10 in a manner known per se in the art of fluid solids handling.

The time of contact of the gas with the catalyst in converter 10 is so chosen that at the prevailing reaction conditions substantially all of the hydrogen of the reacting gas is consumed in the hydrogenation of hydrogenatable constituents such as CO, $CO_2$ and unsaturated hydrocarbons. Normally there is sufficient hydrogen present to convert all of the CO and unsaturated hydrocarbons and part of the $CO_2$ into saturated hydrocarbon gases such as methane, ethane and propane. Space velocities of about 500 to 4,000 v./v./hr. are generally suitable for this purpose. If desired, extraneous hydrogen may be added if available at an economic basis to convert further amounts of $CO_2$ into methane or the like.

Converted tail gas is withdrawn overhead from level $L_{10}$ and passed through a conventional gas-solids separator such as cyclone separator 16 from which separated catalyst fines may be returned through line 18 to mass 12. Converted gas now substantially free of entrained catalyst fines leaves converter 10 through line 20.

Product fuel gas passes through line 24 and heat exchanger 5 to a cooler 26 wherein product water and such small amounts of other normally liquid reaction products as have been formed are condensed. The cooled gas is separated from condensed liquids in separator 28 from which liquids are withdrawn through line 30.

In many cases, particularly when converter 10 is maintained under high pressures the amount of fresh tail gas supplied through line 1 may be insufficient for proper fluidization of catalyst mass 12. I provide, therefore, a gas recycle line 22 through which converted gas may be recycled to the conical bottom portion of converter 10 at any recycle ratio required to improve fluidization. At the reaction condition specified above, a gas recycle ratio of about 0.1 to 2 v./v. fresh feed is normally sufficient for this purpose.

Fuel gas freed from condensable constituents is passed through line 32 to a $CO_2$ scrubbing zone 34 wherein at least a major proportion of its $CO_2$ content is removed. Final product fuel gas of high heating value is withdrawn overhead from scrubbing zone 34 and may be passed, if desired, after a suitable pressure adjustment to the gas pipe line.

The scrubbing operation is preferably performed in two stages. Both stages may employ a conventional scrubbing fluid such as monoethanolamine. However, the first scrubbing stage preferably employs in place of complete reactivation of the rich solution by evaporation of the $CO_2$ a mere flash vaporization procedure by circulating monoethanolamine solution of say 20–30% concentration countercurrently to the gas in a conventional type scrubber operating at about the same pressure as the synthesis reactor. The solution from the bottom of the scrubber is released to a flash drum operating at atmospheric pressure wherein the $CO_2$ is flashed out of the solution. This first stage effects a reduction of the $CO_2$ content of the gas from about 40–60% to about 10%, that is, the gas entering the second stage still contains about 10% of $CO_2$. In the second stage, the gas which has now a relatively low $CO_2$ concentration is substantially completely freed of $CO_2$ by a conventional scrubbing operation involving complete reactivation of the rich solution by driving off the $CO_2$. The advantages of this procedure, which will be described below in greater detail in connection with Figure II of the drawing, reside in considerable savings of scrubbing fluid and heat required for reactivation as well as in a more efficient removal of the $CO_2$.

While I have shown a cooling coil 14 for controlling the temperature in converter 10 it should be understood that other cooling means such as a cooling jacket or a continuous controlled circulation of catalyst through line 9, thence through a cooling zone and back to converter 10 as it has been described for conventional fluid synthesis reactions, may be used instead. Other modifications of the system illustrated by the drawing may occur to those skilled in the art without deviating from the spirit of my invention.

The invention will be further illustrated by the following specific example.

*Example*

Coke obtained by the carbonization of a bituminous Pittsburgh seam coal at a temperature of about 900°–1000° F. is contacted with steam in the form of a dense turbulent mass of finely divided solids fluidized by an upwardly flowing gas at a temperature of about 1800°–1900° F. and a pressure of about 5 to 50 lbs. per sq. in. to produce a water gas having a composition about as follows:

| | Percent |
|---|---|
| $H_2$ | 52 |
| CO | 41 |
| $CH_4$ | 5 |
| $N_2$ | 2 |
| | 100 |

About 350,000,000 cu. ft. per day of this water gas is desulfurized and contacted in a synthesis reactor with a dense turbulent bed of finely divided iron catalyst fluidized by the upwardly flowing gaseous reactants and reaction products at a temperature of about 650° F., a pressure of about 325 lbs. per sq. in. and a space velocity of about 2500 v./v./hr. At these conditions about 11,000 bbl. per day of liquid hydrocarbons, 1000 bbl. per day of alcohols and other oxygenated compounds and about 118,500,000 cu. ft. per day of tail gas are formed. The tail gas has a heating value of about 407 B. t. u.'s per cu. ft. Its composition is about as follows:

| | Percent |
|---|---|
| $H_2$ | 13.40 |
| CO | 1.31 |
| $CH_4$ | 24.34 |
| $C_2H_6$ | 3.84 |
| $C_2H_4$ | 2.32 |
| $C_3H_8$ | 0.06 |
| $C_3H_6$ | 0.23 |
| $N_2$ | 4.50 |
| $CO_2$ | 50.00 |
| | 100.00 |

The total amount of tail gas is subjected to conversion as outlined above at the following reaction conditions:

Catalyst ------------------------------ Nickel

Catalyst Particle Size:
| | |
|---|---|
| 0–20 Microns | 10% |
| 20–40 Microns | 40% |
| 40–80 Microns | 40% |
| 80+ Microns | 10% |
| | 100% |

| | |
|---|---|
| Temperature | 625°–675° F. |
| Pressure | 300 p. s. i. g. |
| Throughput | 2000 v./v./hr. |
| Linear gas velocity | 1 ft./sec. |
| Bed density | 75 lbs./cu. ft. |
| Gas recycle ratio | 0 |

The gas issuing from the converter has a heating value of about 456 B. t. u.'s/cu. ft. and a composition about as follows:

| | Per cent |
|---|---|
| $H_2$ | 0.16 |
| CO | 0.08 |
| $CH_4$ | 31.55 |
| $C_2H_6$ | 6.96 |
| $C_2H_4$ | 0.14 |
| $C_3H_8$ | 0.32 |
| $C_3H_6$ | 0.01 |
| $N_2$ | 5.20 |
| $CO_2$ | 55.58 |
| | 100.00 |

This gas is cooled to about 100° F. and scrubbed of $CO_2$ with monoethanolamine in two steps as will be presently described.

Referring to Figure II, the gas passes in the first step upward through one or more scrubbing towers 234 at approximately 300 p. s. i. pressure and is contacted countercurrently with a water solution of monoethanolamine supplied through line 236. In towers 234 the $CO_2$ content of the outlet gas leaving through line 238 may be reduced so that the $CO_2$ partial pressure is about 24 lbs. per sq. in. or the $CO_2$ content about 8%. The $CO_2$-rich solution is withdrawn through line 240 from the bottom of tower 234, reduced to atmospheric pressure and sent to a flash drum 242 where the flashed $CO_2$ is separated and withdrawn overhead through line 244 while the solution is again pumped back through line 246 via pump 248 to scrubber 234. The circulating solution requirements depend upon the operating pressure, the original $CO_2$ content of the gas, the concentration of amine used and, of course, the total quantity of gas to be treated. For the present case about 2500 gallons per minute of 25% monoethanolamine solution will be circulated to three operating towers 234 each having a diameter of about 9 ft. and a height of about 50 ft. The combined gas stream from the three towers 234 enters the second scrubbing step which consists of a single tower 250 which may be about 10 ft. in diameter and 50 ft. high, supplied with about 500 gallons per minute of 25% monoethanolamine solution. In tower 250 the $CO_2$ content of the gas is reduced to approximately 2.5% or any other range needed to obtain the 1000 B. t. u.'s/cu. ft. heating value desired. Final product gas is withdrawn through line 251. The rich $CO_2$ solution released from tower 250 through line 252 is heat exchanged in heat exchanger 253 with lean $CO_2$ solution and passed to a reactivator 260 heated indirectly by steam coil 262 at the bottom. The reactivated solution is then pumped through line 264 via pump 266 back to scrubber 250 through the above mentioned heat exchanger 253 and a final cooler 266 to begin the scrubbing cycle again. $CO_2$ leaves scrubber 260 through line 268, if desired, after cooling with water in cooler 270 to reduce monoethanolamine losses and to maintain the desired concentration of the monoethanolamine.

The gas, after scrubbing, amounts to about 46,700,000 cu. ft. per day and has a composition approximately as listed below:

| | |
|---|---|
| $H_2$ | 0.34 |
| CO | 0.17 |
| $CH_4$ | 69.24 |
| $C_2H_6$ | 15.25 |
| $C_2H_4$ | 0.30 |
| $C_3H_8$ | 0.69 |
| $C_3H_6$ | 0.02 |
| $N_2$ | 11.40 |
| $CO_2$ | 2.59 |

This gas has a heating value of about 1,000 B. t. u.'s, that is, about 250% of the heating value of the tail gas prior to conversion.

If the tail gas had been scrubbed of $CO_2$ prior to conversion the heating value of the scrubbed but unconverted gas would have been increased merely to about 800 B. t. u.'s per cut ft. To raise the 800 B. t. u.'s/cu. ft. of gas by 200 B. t. u.'s/cu. ft., about 3,700 bbl. per day of butane are necessary, that is, about ⅓ of the total liquid hydrocarbons produced in the synthesis stage would be required to bring the heating value up to the 1,000 B. t. u.'s obtained by my process.

The foregoing description and exemplary operations have served to illustrate specific applications and results of my invention. However, other modifications obvious to those skilled in the art are within the scope of my invention. Only such limitations should be imposed on the invention as are indicated in the appended claims.

I claim:

1. The process of increasing the heating value of tail gas obtained by reacting CO and $H_2$ in the presence of a synthesis catalyst at synthesis conditions and removing normally liquid synthesis products from the total synthesis product, which comprises contacting a tail gas of the type specified which contains about 10–20% per volume of hydrogen, 1–5% per volume of carbon monoxide and 18–40% per volume of saturated and unsaturated normally gaseous hydrocarbons including about 2–4.5 % per volume of unsaturates in a conversion zone with a hydrogenating catalyst at hydrogenating conditions conducive to the hydrogenation of hydrogenatable tail gas constituents with hydrogen present in the tail gas and to the substantially exclusive formation of substantially saturated normally gaseous hydrocarbons, and withdrawing from said conversion zone a total hydrogenated product consisting essentially of a normally gaseous mixture of high heating value having a hydrogen content amounting to only a small faction of that of said tail gas.

2. The process of claim 1 wherein said synthesis catalyst is an iron catalyst.

3. The process of claim 2 wherein said hydrogenating catalyst is catalyst spent in said synthesis.

4. The process of claim 1 in which said hydrogenating catalyst comprises nickel.

5. The process of claim 1 wherein $CO_2$ is removed from said tail gas after said hydrogenating treatment.

6. The process of claim 1 wherein said hydrogenation catalyst has a high selectivity for the formation of saturated hydrocarbon gases from carbon oxides and hydrogen.

7. The process of claim 1 wherein said hydrogenation catalyst is maintained in said conversion zone in the form of a dense turbulent mass of finely divided solids fluidized by an upwardly flowing gas.

8. The process of claim 1 wherein said hydrogenating conditions comprise temperatures of about 500°–850° F. and pressures of about 100–1000 lbs. per sq. in.

9. The process of claim 1 wherein said hydrogenation catalyst is maintained in said conversion zone in the form of a dense turbulent mass of finely divided solids fluidized by an upwardly flowing gas and a portion of the gas issuing from said conversion zone is recycled to the bottom portion of said mass.

WALTER G. SCHARMANN.

REFERENCES CITED

The following references are of record in the file of this patent:

UNITED STATES PATENTS

| Number | Name | Date |
|---|---|---|
| 1,746,464 | Fischer | Feb. 11, 1930 |
| 2,251,554 | Sabel | Aug. 5, 1941 |
| 2,301,687 | Dorschner | Nov. 10, 1942 |
| 2,368,600 | Rosenstein | Jan. 30, 1945 |
| 2,417,164 | Huber | Mar. 11, 1947 |
| 2,436,938 | Scharmann et al. | Mar. 2, 1948 |